US009957036B2

(12) United States Patent
Sanderson et al.

(10) Patent No.: US 9,957,036 B2
(45) Date of Patent: May 1, 2018

(54) AIRCRAFT STRUCTURE

(71) Applicant: AIRBUS OPERATIONS LIMITED, Bristol (GB)

(72) Inventors: Timothy J. Sanderson, Bristol (GB); Jonathan Price, Bristol (GB); James Eden, Bristol (GB); Chetan Korya, Bristol (GB); Robert James Heath, Bristol (GB); Peter Baker, Bristol (GB); Richard Smith, Bristol (GB); Graham Morgan, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 97 days.

(21) Appl. No.: 14/433,438

(22) PCT Filed: Sep. 30, 2013

(86) PCT No.: PCT/GB2013/052542
§ 371 (c)(1),
(2) Date: Apr. 3, 2015

(87) PCT Pub. No.: WO2014/053816
PCT Pub. Date: Apr. 10, 2014

(65) Prior Publication Data
US 2015/0217852 A1 Aug. 6, 2015

(30) Foreign Application Priority Data
Oct. 5, 2012 (GB) .................................. 1217801.8

(51) Int. Cl.
*B64C 3/00* (2006.01)
*B64C 3/18* (2006.01)
(Continued)

(52) U.S. Cl.
CPC .............. *B64C 3/185* (2013.01); *B64C 1/065* (2013.01); *B64C 3/10* (2013.01); *B64C 3/20* (2013.01); *Y10T 29/49622* (2015.01)

(58) Field of Classification Search
CPC ........... B64C 3/185; B64C 1/065; B64C 3/10; B64C 3/20; B64C 1/06; B64C 3/18
See application file for complete search history.

(56) References Cited

U.S. PATENT DOCUMENTS 1,433,729 A 10/1922 Kemp
4,120,998 A * 10/1978 Olez ........................ B64C 1/26
156/169
(Continued)

FOREIGN PATENT DOCUMENTS

DE 3003363 A1 8/1981
GB 876438 A 8/1961
(Continued)

OTHER PUBLICATIONS

International Search Report dated Feb. 4, 2014 in International Application No. PCT/GB2013/052542, filed Sep. 30, 2013.
(Continued)

*Primary Examiner* — Assres H Woldemaryam
(74) *Attorney, Agent, or Firm* — Hauptman Ham, LLP

(57) ABSTRACT

The present invention provides an aircraft structure comprising a first sub-structure, having a first box cross-section, a second sub-structure, having a second box cross-section, and a joint joining a first end region of the first sub-structure to second end region of the second sub-structure, wherein the joint comprises an overlap region where the end regions of the first and the second sub-structures overlap such that the first sub-structure is inside the second sub-structure. The
(Continued)

present invention also provides an aircraft comprising such an aircraft structure and a method of manufacturing an aircraft structure.

17 Claims, 4 Drawing Sheets

(51) Int. Cl.
  *B64C 1/06* (2006.01)
  *B64C 3/10* (2006.01)
  *B64C 3/20* (2006.01)

(56) References Cited

U.S. PATENT DOCUMENTS

| | | | | |
|---|---|---|---|---|
| 6,190,484 | B1* | 2/2001 | Appa | B29C 70/32 |
| | | | | 156/169 |
| 8,617,687 | B2* | 12/2013 | McCarville | B29C 70/30 |
| | | | | 244/117 R |
| 9,144,948 | B2* | 9/2015 | Firko | B29D 99/0003 |
| 9,193,114 | B2* | 11/2015 | Arnold | B29C 70/545 |
| 9,272,767 | B2* | 3/2016 | Stewart | B64C 1/064 |
| 2008/0290214 | A1* | 11/2008 | Guzman | B29C 43/10 |
| | | | | 244/119 |
| 2009/0072088 | A1* | 3/2009 | Ashton | B64C 3/185 |
| | | | | 244/124 |
| 2009/0159742 | A1* | 6/2009 | Ramirez Blanco | B64C 5/02 |
| | | | | 244/87 |
| 2010/0170986 | A1 | 7/2010 | Lafly et al. | |
| 2011/0135886 | A1* | 6/2011 | Winter | B29C 70/504 |
| | | | | 428/178 |
| 2011/0198443 | A1* | 8/2011 | Noebel | B64C 1/068 |
| | | | | 244/119 |
| 2012/0211607 | A1* | 8/2012 | Sanderson | B64C 3/185 |
| | | | | 244/35 R |
| 2012/0213640 | A1* | 8/2012 | Sanderson | B64C 3/185 |
| | | | | 416/226 |

FOREIGN PATENT DOCUMENTS

| | | |
|---|---|---|
| WO | 2009/036296 A1 | 3/2009 |
| WO | 2010/018063 A1 | 2/2010 |

OTHER PUBLICATIONS

Written Opinion dated Feb. 4, 2014 in International Application No. PCT/GB2013/052542, filed Sep. 30, 2013.

* cited by examiner

AIRCRAFT STRUCTURE

RELATED APPLICATIONS

The present application is a National Phase of International Application Number PCT/GB2013/052542, filed Sep. 30,2013, and claims priority from Great Britain Application No. 1217801.8, filed Oct. 5, 2012.

BACKGROUND OF THE INVENTION

The present invention concerns aircraft structures.

More particularly, but not exclusively, this invention concerns an aircraft structure comprising a joint between two sub-structures, in particular between two sections of wing. The invention also concerns an aircraft comprising such an aircraft structure and a method of manufacturing an aircraft structure.

There are many different known ways of connecting two wing sections together. For example, a full tension fitting arrangement can be used to connect two wing box sections together or to attach a wing tip to a wing box. Such an arrangement is a quick way of connecting the two sub-structures together but has a weight penalty, as the tensioning arrangement is relatively heavy.

Another way of attaching two wing sections together involves having a cruciform structure in between an outer wing box and a centre wing box on the upper cover and having a triform structure in between the two wing boxes on the lower cover. These are shown in FIGS. 1a and 1b, respectively.

In FIG. 1a, it can be seen that a generally upright portion 11 of the cruciform structure 10 is connected to a shared rib 20 of both wing boxes 30, 40. A first generally horizontal portion 12 of the cruciform structure is attached to the upper cover 37 of the outer wing box 30 and to a stringer flange 31a of a stringer 31 of the outer wing box 30 by bolts 33 (a to d, although not individually labelled). A second generally horizontal portion 13 of the cruciform structure 10 is attached to a stringer flange 41a of a stringer 41 of the centre wing box 40 again by bolts 43 (a to d, although not individually labelled). There are also additional crown fittings 32, 42 used to spread the load between the cruciform structure 10 and the stringers 31, 41 of both wing boxes 30, 40. The crown fittings 32, 42 are attached to the shared rib 20 and cruciform structure 10 by a tension bolt 21 extending through the shared rib 20, generally upright portion 11 of the cruciform structure 10 and crown fitting flanges 32a, 42a of the crown fittings 32, 42. The crown fittings 32, 42 are attached to the stringers 31, 41 of both wing boxes by fasteners 34, 44 through blades 32b, 42b of the crown fittings 32, 42 and stringer blades 31b, 41b of the stringers 31, 41.

In FIG. 1b it can be seen that a generally upright portion 51 of the triform structure 50 is attached to the shared rib 20 by a bolt 22. Two generally horizontal portions 52, 53 of the triform structure 50 are also attached to stringer flanges 35a, 45a of stringers 35, 45 of both wing boxes 30, 40 by bolts 36a, 36b, 36c, 36d, 46a, 46b, 46c, 46d. In addition, a splice plate 23 (also known as a buttstrap) connects the two stringers 35. 45. It is also held in place by some of the same bolts 36b, 36c, 36d, 46a, 46b, 46c attaching the stringer flanges 35a, 45a to the triform structure 50.

Having a cruciform and triform structure to connect two wig boxes allows the two wing boxes to be able to be completed separately. However, it also means that the joining procedure is relatively complex and requires significant fettling and shimming to meet the required tolerances. This takes a significant amount of time to do. In addition, a large number of parts are involved, which adds to the costs and weight of the aircraft.

The present invention seeks to mitigate the above-mentioned problems. Alternatively or additionally, the present invention seeks to provide an improved aircraft structure, an improved aircraft and an improved method of manufacturing an aircraft structure.

SUMMARY OF THE INVENTION

The present invention provides, according to a first aspect, an aircraft structure comprising a first sub-structure, having a first box cross-section, a second sub-structure, having a second box cross-section, and a joint joining a first end region of the first sub-structure to second end region of the second sub-structure, wherein the joint comprises an overlap region where the end regions of the first and the second sub-structures overlap such that the first sub-structure is inside the second sub-structure.

Such an arrangement allows the two sub-structures to be joined together quickly and easily. The joint is also low in weight. In addition, bolts used to connect the two sub-structures are loaded under shear force, especially when the joint is chordwise, rather than under tension.

Preferably, in the overlap region of the joint, the first box cross-section of the first sub-structure is contained within the second box cross-section of the second sub-structure.

More preferably, in the overlap region of the joint, outer sides of the first box cross-section of the first sub-structure are in contact with inner sides of the second box cross-section of the second sub-structure. Even more preferably, all outer sides of the first box cross-section of the first sub-structure are in contact with inner sides of the second box cross-section of the second sub-structure.

Even more preferably, all inner sides of the second box cross-section of the second sub-structure are in contact with outer sides of the first box cross-section of the first sub-structure.

Preferably, each box cross-section of the sub-structures has four sides formed from one or more structural elements, such as spars and covers. Alternatively, one or more of the box cross-sections may have only three sides, therefore giving a partial box structure.

More preferably, one or both of the box cross-sections of the sub-structures are formed by an n-shape or top-hat-shape spar on three sides and a separate cover on a fourth side.

Preferably, one or both of the box cross-sections of the sub-structures are formed by a u-shape or upside-down-top-hat-shape spar on three sides and a separate cover on a fourth side.

Preferably, one or both of the box cross-sections of the sub-structures are formed by a four sided box spar. Here, one or more of the sub-structures may be formed from a single structural element.

Preferably, one or both of the box cross-sections of the sub-structures are formed by two spars on two opposite sides and two covers on the remaining sides.

Preferably, on one or both of the sub-structures, extended portions of one or more structural elements extend further than the box cross-sections.

More preferably, one or more of the structural elements of the second sub-structure are separated from other structural elements of the second sub-structure by one or more extended portions of one or more structural elements of the first sub-structure. Hence, the second sub-structure is in the form of a separated box structure.

Preferably, the first and second sub-structures are attached to each other using fasteners, such as bolts, fastened through structural elements of both sub-structures. Alternatively, they could be attached together using bonding or welding.

Preferably, one of the sub-structures comprises a structural element with an offset portion in the overlap region that is offset from a portion of that structural element adjacent the overlap region, such that a portion of a structural element of the other sub-structure can be located adjacent to the offset portion in the overlap region. This allows the structural element of the other sub-structure to be aligned with the non-offset portion of the one sub-structure.

More preferably, the portion of the structural element of the other sub-structure is substantially in the same plane as the portion adjacent the overlap region of the structural element of the one sub-structure.

Preferably, one or more sides of the second box-section of the second sub-structure are angled outwards. This allows the first sub-structure to be easily placed inside the second sub-structure. For example, one or more of the sides of the second sub-structure may be angled by an angle of approximately 3 degrees.

Preferably, the first sub-structure has a cross-section that decreases away from its first end region and wherein the second sub-structure has a cross-section that increases away from its second end region. This allows the first sub-structure to be slid inside the second sub-structure from a far end towards the joint/overlap region. Hence, the second sub-structure may be a complete box cross-section prior to joining with the first sub-structure.

Also according to a first aspect of the invention there is provided an aircraft comprising the aircraft structure as described above.

Also according to a first aspect of the invention there is provided a method of manufacturing an aircraft structure comprising the following steps: providing a first sub-structure, providing a second sub-structure, placing a first end region of the first sub-structure adjacent the second end region of the second sub-structure, such that the end regions of the first and the second sub-structures overlap, providing any necessary additional structural elements so that both sub-structures have box cross-sections and so that the box cross-section of the first sub-structure is inside the box cross-section of the second sub-structure, and joining the first and second sub-structures together in the overlap region.

Preferably, the first and second sub-structures are joined using fasteners, such as bolts, fastened through structural elements of both sub-structures. Alternatively, they could be attached together using bonding or welding.

Preferably, the first sub-structure has a cross-section that decreases away from its first end region and wherein the second sub-structure has a cross-section that increases away from its second end region and wherein the second sub structure is moved inside the first sub-structure towards the second end region of the second sub-structure. This allows the first sub-structure to be slid inside the second sub-structure from a far end towards the joint/overlap region. Hence, the second sub-structure may be a complete box cross-section prior to joining with the first sub-structure.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2b shows a perspective view of the two wing boxes in FIG. 2a;

DETAILED DESCRIPTION

Figure 1A:
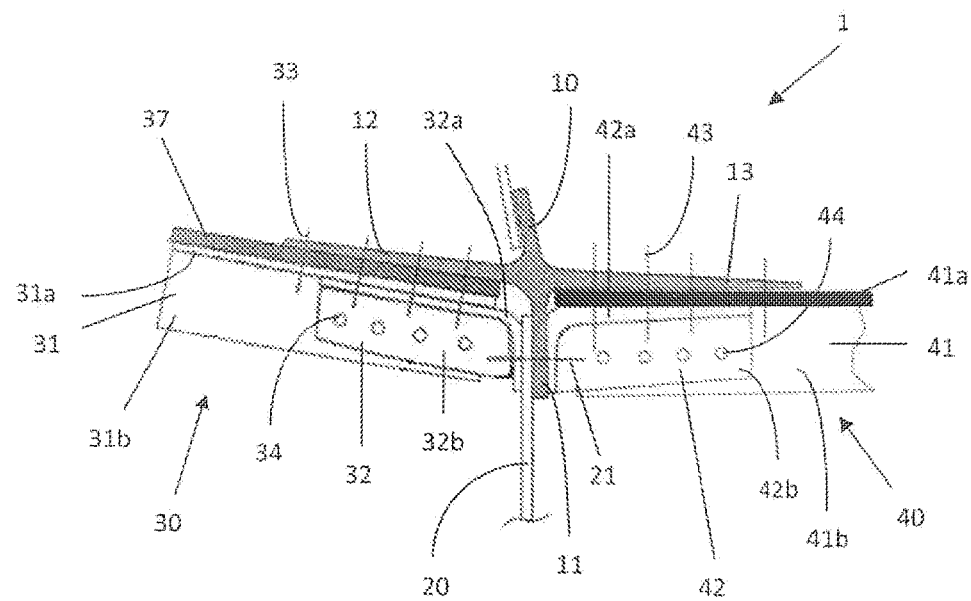
FIG. 1a shows a chordwise cross-sectional view of a prior art joint between a centre wing box and an outer wing box at an upper cover.
Figure 1B:
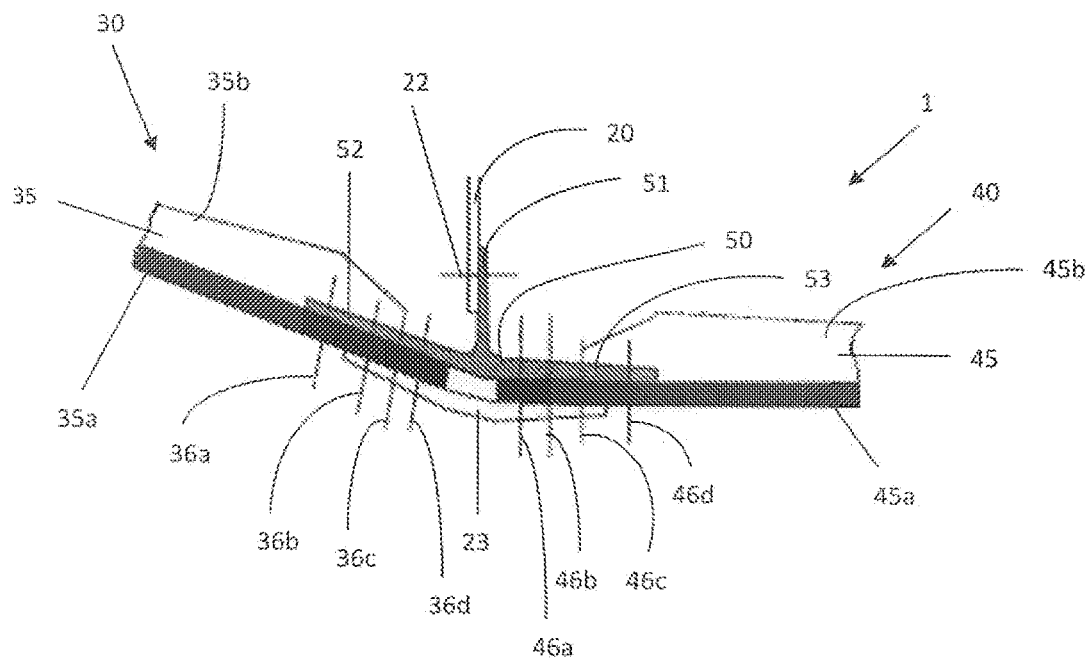
FIG. 1b shows a chordwise cross-sectional view of a prior art joint between a centre wing box and an outer wing box at a lower cover.
Figure 2A:
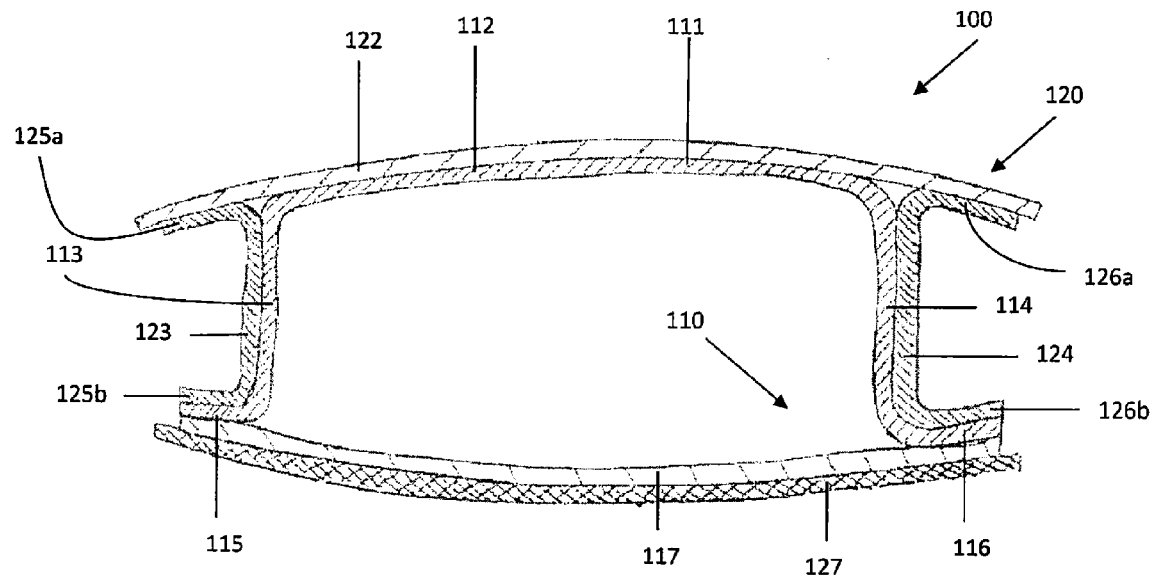
FIG. 2a shows a spanwise cross-sectional view of a joint/overlap region of two wing boxes according to a first embodiment of the invention.

FIG. 2a shows a spanwise cross-sectional view of a joint/overlap region 100 of two wing boxes 110, 120 according to a first embodiment of the invention.

The first, inner wing box 110 comprises an n-shaped spar 111 with a generally horizontal top portion 112 and two generally vertical side portions 113, 114. The side portions 113, 114 are each formed with an outwardly extending generally horizontal flange portion 115, 116 (giving the spar 111 an omega-shape). The inner wing box 110 also comprises a lower cover 117 extending underneath and between the outer edges of the flange portions 115, 116.

The second, outer wing box 120 comprises a generally horizontal upper cover 122 on top of the top portion 112 of the first wing box 110. The second wing box 120 also comprises two generally vertical outwardly facing side spars 123, 124. Each side spar 123, 124 is angled outwards at a shallow draft angle of 3 degrees. Each side spar 123, 124 comprises an upper 125a, 126a and lower 125b, 126b flange portion extending outwards. The spar flange portions 125a, 125b, 126a, 126b extend outwards the same distance as the flange portions 115, 116 of the n-shape spar 111 of the first wing box 110. The upper cover 122 extends between from slightly beyond the upper flange portions 125a, 126a. The second wing box 120 also comprises a generally horizontal lower cover 127 beneath the lower cover 117 of the first wing box 110. The lower cover 127 extends between from slightly beyond the lower flange portions 125b, 126b.

Figure 2B:
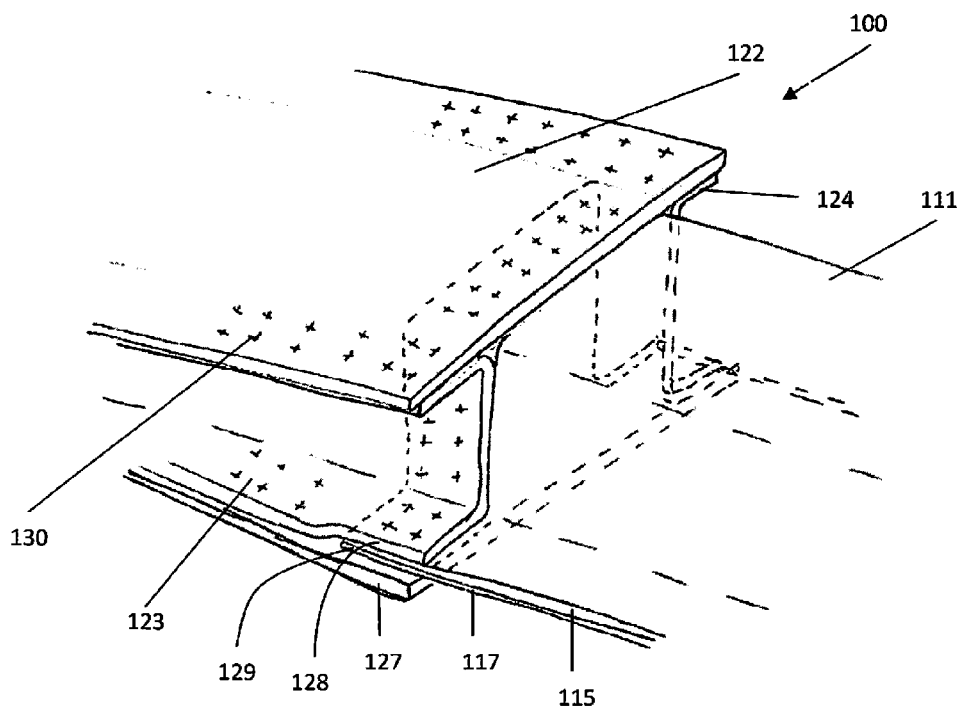

FIG. 2b shows a perspective view of the two wing boxes 110, 120 in FIG. 2a. Here, it can be seen that shear bolts 130 are used to form the two wing boxes 110, 120 and attach them together. For example, shear bolts 130 are bolted through the following portions:

Upper cover 122 of second wing box 120 and upper flange portions 125a, 126a side spars 123, 124 of second wing box 120, Upper cover 122 of second wing box 120 and top portion 112 of n-shape spar 111 of first wing box 110, Spars 123, 124 of second wing box 120 and sides 113, 114 of first wing box 110, Lower flange portions 125*b*, 126*b* of side spars 123, 124 of second wing box 120, flange portions 115, 116 of n-shape spar 111 of first wing box 110, lower cover 117 of first wing box 110 and lower cover 127 of second wing box 120, and Lower flange portions 125*b*, 126*b* of side spars 123, 124 of second wing box 120 and lower cover 127 of second wing box 120.

This figure also shows an offset portion 128 of the lower flange 125*b* of the second wing box 120 in the overlap region. The offset portion 128 is raised above the plane of the rest of the flange 125*b* so as to give a space 129 for the lower cover 117 of the first wing box 110 and the flange portion 115 of the first wing box 110. A similar offset portion and space is present for the other lower flange 126*b* of the second wing box 120.

Figure 3:
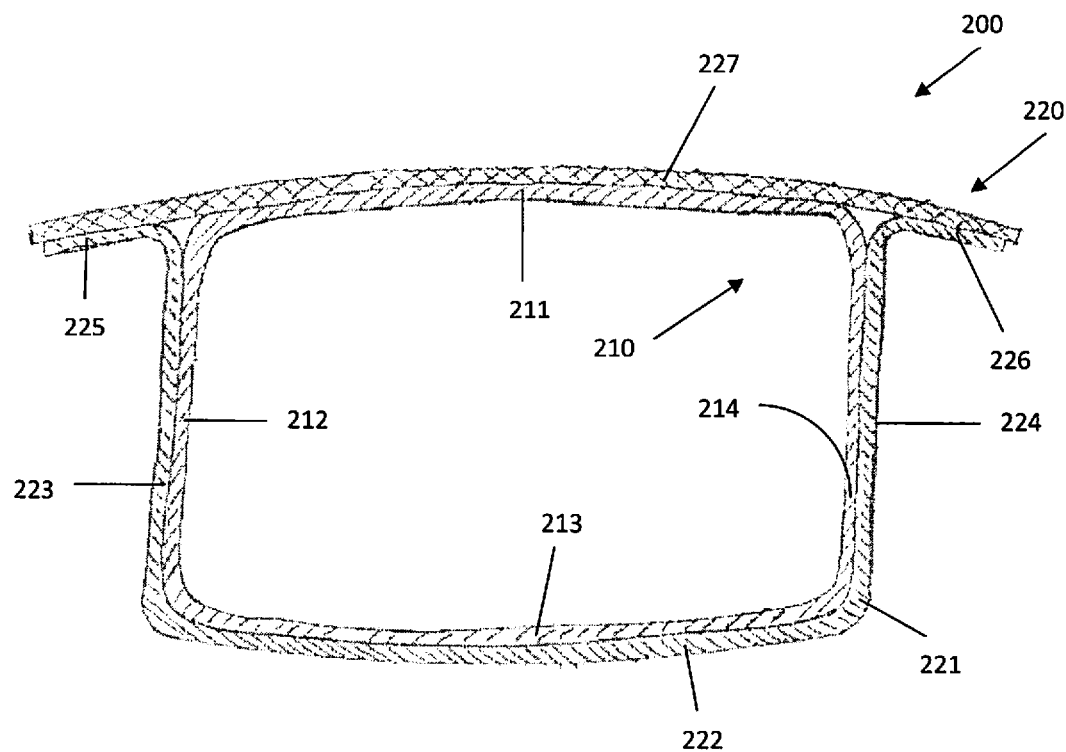
FIG. 3 shows a chordwise cross-sectional view of a joint/overlap region of two wing boxes according to a second embodiment of the invention.

FIG. 3 shows a chordwise cross-sectional view of a joint/overlap region 200 of two wing boxes 210, 220 according to a second embodiment of the invention.

The first, inner wing box 210 comprises four-sided box spar 211 with a generally horizontal top portion 211, two generally vertical side portions 212, 214 and a generally horizontal bottom portion 213.

The second, outer wing box 220 comprises a generally horizontal upper cover 227 on top of the top portion 211 of the first wing box 210 and extending outwards beyond the edges of the top portion 211. The second wing box 220 also comprises a u-shaped spar 221 with a generally horizontal bottom portion 222 beneath the lower portion 213 of the first wing box 210 and two generally vertical side portions 223, 224 adjacent the side portions 212, 214 of the first wing box 210. Each side portion 223, 224 is angled outwards at a shallow draft angle of 3 degrees. Each side portion 223, 224 comprises an upper flange portion 225, 226 extending outwards. The flange portions 225, 226 extend outwards the same distance as the flange portions upper cover 227 of the second wing box 220.

Figure 4:
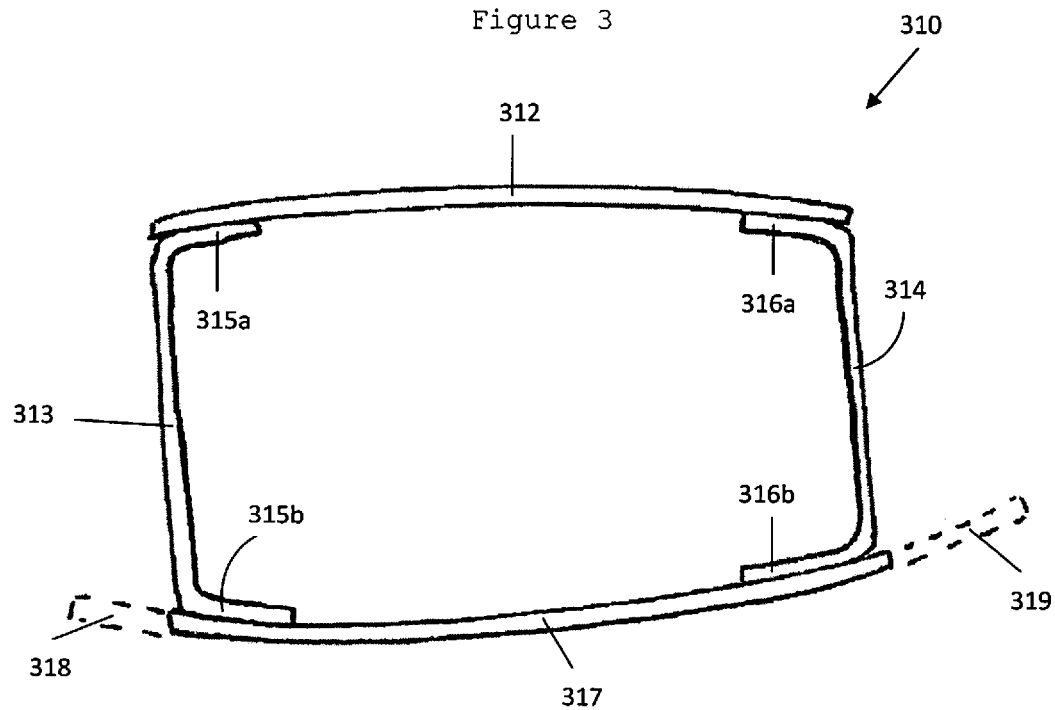
FIG. 4 shows a chordwise cross-sectional view of a wing box, for use in a third embodiment of the invention.

FIG. 4 shows a chordwise cross-sectional view of a wing box 310, for use in a third embodiment of the invention. The wing box 310 is especially suited for use as an inner wing box, but could also be used as an outer wing box.

The wing box 310 comprises a generally horizontal upper cover 312 and two generally vertical inwardly facing side spars 313, 314. Each side spar 313, 314 comprises a generally horizontal upper 315*a*, 316*a* and a generally horizontal lower flange portion 315*b*, 316*b* extending inwards. The outer vertical portions of the side spars 313, 314 are in line with the edges of the upper cover 312. The upper flange portions 315*a*, 316*a* are underneath the upper cover 312. A generally horizontal lower cover 317 is beneath the lower flange portions 315*b*, 316*b*. The edges of the lower cover 317 may be in line with outer vertical portions of the side spars 313, 314. As an alternative, as shown by the dashed lines, the lower cover 127 may have "grow outs" 319 such that the lower cover 317 may extend between from slightly beyond the side spars 313, 314 and upper cover 312.

Figure 5:
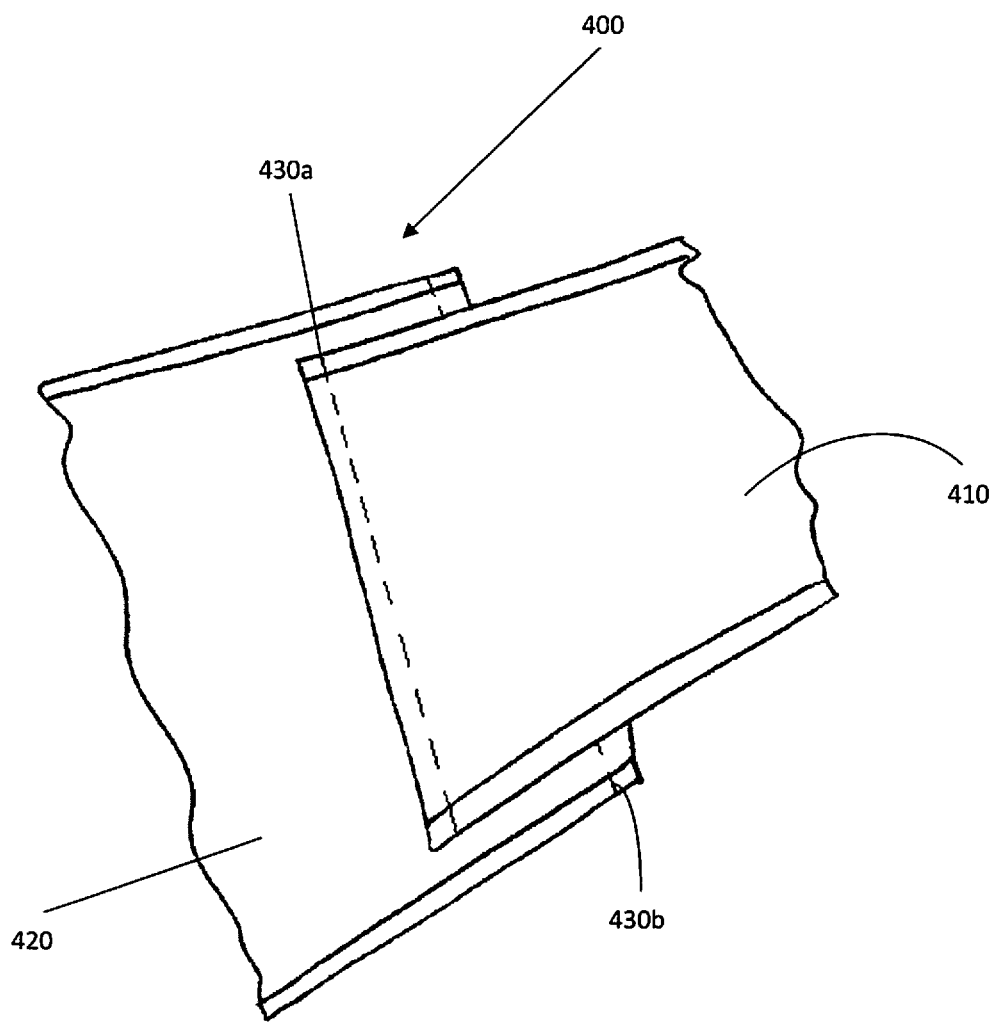
FIG. 5 shows a plan view of two wing boxes, ready to be joined together according to a fourth embodiment of the invention.

FIG. 5 shows a plan view of two wing boxes 410, 420, ready to be joined together according to a fourth embodiment of the invention. As can be seen, the inner wing box 410 has a cross section that decreases as the wing box extends away from the joining region 400. It is noted that dashed line 430*a* represents one of the largest cross-sections of wing box 410 at a root end of the wing box 410. Conversely, the outer wing box 420 has a cross section that increases as the wing box extends away from the joining region 400. It is noted that dashed line 430*b* represents one of the smallest cross-sections of wing box 420 at a tip end of the wing box 420.

In FIG. 5, the inner wing box 410 is being slid into position with respect to wing box 420 by sliding it inside the wing box 420 so that cross-section 430*a* abuts against corresponding cross-section 430*b*.

This arrangement removes the need for the side portions (e.g. side spars or side portions of u- or n-shaped spars) to be at an angle to the upper/lower covers. This is because the inner wing box can be slid along through the outer wing box instead of being placed up/down into it.

In the above embodiments, references to inner wing boxes and outer wing boxes refers to which wing box is located inside the other wing box in the joining/overlap region. Inner/outer wing boxes do not refer to the relative position of the wing boxes in relation to the root/tip of the wing itself.

During manufacture of the above embodiments, the first, inner wing box is fully assembled with its ribs and systems installed. If the inner wing box has grow outs, as in FIG. 4, these may be removed. The second, outer wing box is also assembled, however, it is not fully assembled and has its upper cover missing at this stage. The shim/fettle allowance of the two wing boxes is scanned so that one of the wing boxes (generally the first, inner wing box) is machined to match the interface with the other wing box (generally the second, outer wing box).

Except for the FIG. 5 embodiment, to join the two wing boxes together, the fist, inner wing box is lowered into position with respect to the second, outer wing box. This process is aided by the shallow draft angle in the side portions/spars of the second, outer wing box.

Once positioned in place, shear bolts are used to secure the two wing boxes together. Stringers (not shown) may also be connected together through simple splice plates (not shown) between the two wing boxes. These splice plates provide a similar function to the crown fittings in the prior art. However, these splice plates are loaded in shear, rather than tension (as the crown fittings generally are).

Once, this has been done, the missing cover of the second, outer wing box, which has been machined to match the profile of the resulting assembly, is installed and further shear bolts are used to attach the cover.

In all of the above embodiments, the join region is intended to be placed at a point on the wing away from areas where required aerodynamic contours are required. This makes assembly simplified.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above embodiments, it is envisaged that the two wing boxes are assembled as much as possible separately prior to being joined together. In particular, it is envisaged that at least one of the wing boxes is assembled with all of its ribs prior to being joined to the other wing box. In addition, systems may also be installed on one or more of the wing boxes. However, different elements of the wing boxes may be assembled into the wing boxes after they have been joined together. For example, ribs in the first, inner wing box may be installed after the first wing box has been joined to the second, outer wing box.

If the first, inner wing box has external facing spar flanges, allowance needs to be made for these through joggling or the use of a separate component to ensure adequate load transfer across the joint.

As an alternative to the embodiment of FIG. 5, the inner wing box 410 may instead by slid into the outer wing box 410 from the tip end to the root end, depending on the shape of the final wing required and the required angles of the leading edge and trailing edge of different sections of the wing provided by the wing boxes 410, 420.

The use of overlapping structures can be used in other places on the aircraft, rather than just joining one wing box to another at a chordwise point along the wing. For example, such a joint could be used between a root wing box and the fuselage, between a wing tip and a wing box structure (although this is unlikely as the wing tip joint is traditionally a temporary joint), between a horizontal tailplane and the fuselage, between a horizontal tailplane and the other horizontal tailplane or between a vertical tailplane and the fuselage (although this is unlikely as vertical tail planes are not traditionally made from box structures).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft structure comprising;
    a first sub-structure, having a first box cross-section,
    a second sub-structure, having a second box cross-section, and
    a joint joining a first end region of the first sub-structure to a second end region of the second sub-structure,
    wherein the joint comprises an overlap region where the end regions of the first and the second sub-structures overlap such that the first sub-structure is inside the second sub-structure,
    wherein each box cross-section of the sub-structures has four sides formed from one or more structural elements, and
    wherein on one or both of the sub-structures, extended portions of one or more structural elements extend further than the box cross-sections.

2. The aircraft structure as claimed in claim 1, wherein in the overlap region of the joint, the first box cross-section of the first sub-structure is contained within the second box cross-section of the second sub-structure.

3. The aircraft structure as claimed in claim 1, wherein, in the overlap region of the joint, outer sides of the first box cross-section of the first sub-structure are in contact with inner sides of the second box cross-section of the second sub-structure.

4. The aircraft structure as claimed in claim 1, wherein one or both of the box cross-sections of the sub-structures are formed by an n-shape or top-hat-shape spar on three sides and a separate cover on a fourth side.

5. The aircraft structure as claimed in claim 1, wherein one or both of the box cross-sections of the sub-structures are formed by a u-shape or upside-down-top-hat-shape spar on three sides and a separate cover on a fourth side.

6. The aircraft structure as claimed in claim 1, wherein one or both of the box cross-sections of the sub-structures are formed by a four sided box spar.

7. The aircraft structure as claimed in claim 1, wherein one or both of the box cross-sections of the sub-structures are formed by two spars on two opposite sides and two covers on the remaining sides.

8. The aircraft structure as claimed in claim 1, wherein one or more of the structural elements of the second sub-structure are separated from one or more of the structural elements of the second sub-structure by one or more extended portions of one or more of the structural elements of the first sub-structure.

9. The aircraft structure as claimed in claim 1, wherein the first and second sub-structures are attached to each other using fasteners fastened through structural elements of both sub-structures.

10. The aircraft structure as claimed in claim 1, wherein one of the sub-structures comprises a structural element with an offset portion in the overlap region that is offset from a portion of that structural element adjacent the overlap region, such that a portion of a structural element of the other sub-structure can be located adjacent to the offset portion in the overlap region.

11. The aircraft structure as claimed in claim 10, wherein the portion of the structural element of the other sub-structure is substantially in the same plane as the portion adjacent the overlap region of the structural element of the one sub-structure.

12. The aircraft structure as claimed in claim 1, wherein one or more sides of the second box cross-section box section of the second sub-structure are angled outwards.

13. The aircraft structure as claimed in claim 1, wherein the first sub-structure has a cross-section that decreases away from the first end region and wherein the second sub-structure has a cross-section that increases away from the second end region.

14. An aircraft comprising the aircraft structure of claim 1.

15. A method of manufacturing an aircraft structure comprising the following steps:
    providing a first sub-structure,
    providing a second sub-structure,
    placing a first end region of the first sub-structure adjacent the second end region of the second sub-structure, such that the end regions of the first and the second sub-structures overlap,
    providing at least one additional structural element so that both sub-structures have box cross-sections and so that the box cross-section of the first sub-structure is inside the box cross-section of the second sub-structure,
    joining the first and second sub-structures together in the overlap region, and
    wherein each box cross-section of the sub-structures has four sides formed from one or more structural elements, and
    wherein on one or both of the sub-structures, extended portions of one or more structural elements extend further than the box cross-sections.

16. The method of manufacturing an aircraft structure as claimed in claim 15, wherein the first and second sub-structures are joined using fasteners, fastened through structural elements of both sub-structures.

17. The method of manufacturing an aircraft structure as claimed in claim 15, wherein the first sub-structure has a cross-section that decreases away from its first end region and wherein the second sub-structure has a cross-section that increases away from its second end region and wherein the second sub structure is moved inside the first sub-structure towards the second end region of the second sub-structure.

* * * * *